United States Patent Office 3,209,614
Patented Oct. 5, 1965

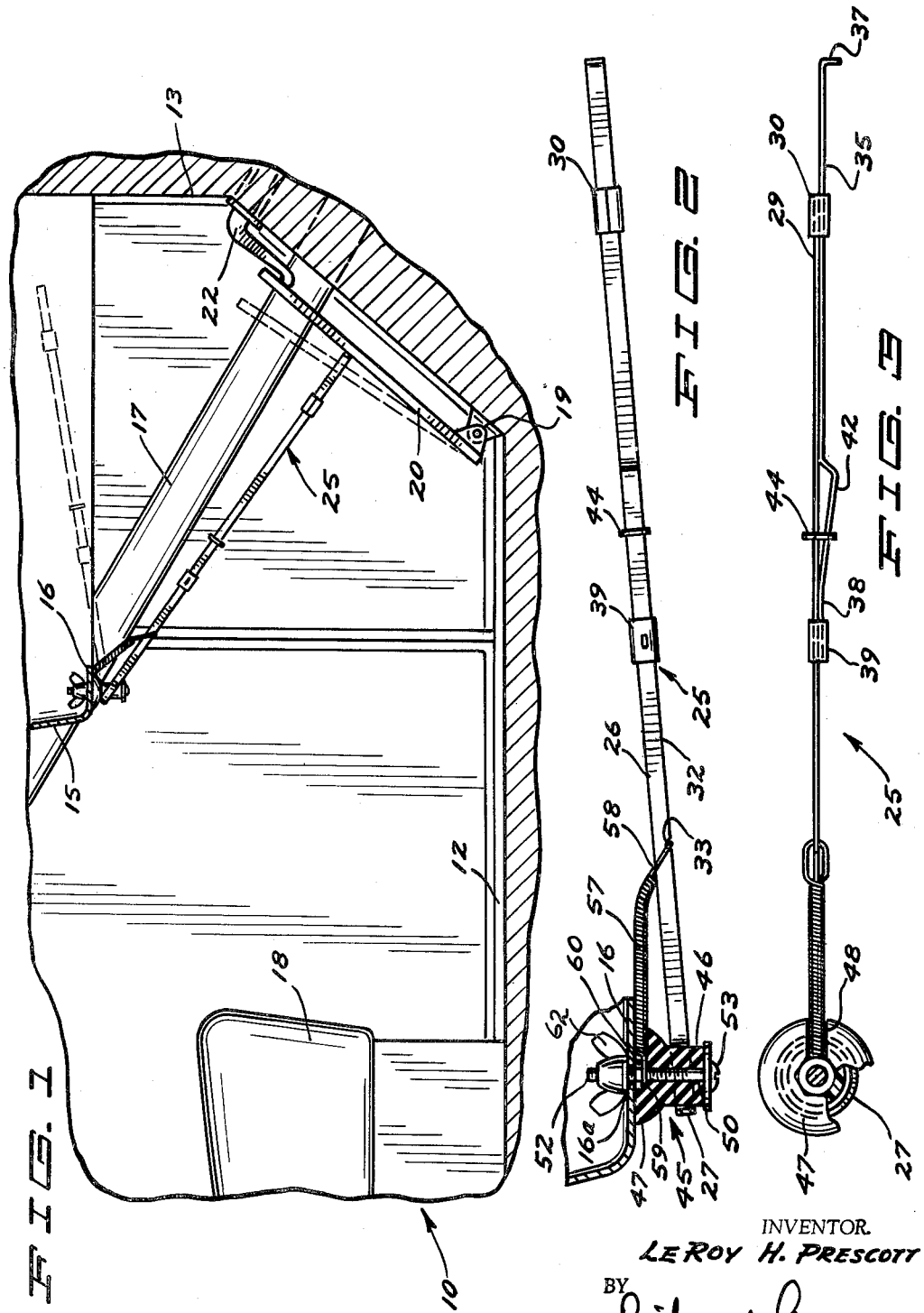

3,209,614
ACCELERATOR PEDAL DEPRESSING DEVICE
Le Roy H. Prescott, 804 7th Ave. N., Princeton, Minn.
Filed Apr. 30, 1963, Ser. No. 276,938
4 Claims. (Cl. 74—532)

This invention relates to an improvement in a device to be used in connection with the operation at a desired rate of speed of the motor of an automotive vehicle.

It is desirable to have such a device to removably and adjustably engage and depress the accelerator or gas pedal of an automotive vehicle to cause the motor thereof to operate at a desired rate of speed, such as at a fast idling speed. It is particularly desirable in cold weather to have a device particularly adapted to hold the gas pedal in a certain desired position to cause the motor to idle at a sufficient rate of speed to become warmed up without draining the battery. The normal idling speed of a motor is not sufficient to keep the battery in a charged condition, but rather tends to cause the battery to discharge. It is a common practice to provide automotive vehicles with an automatic choke rather than with a manual choke whereby the operator is unable to govern the speed of the motor by choke adjustment. An automatic choke does not provide for sufficient acceleration of a cold motor to avoid a discharge of the battery.

It is an object of this invention therefore to provide a device for removably and adjustably positioning the gas pedal of an automotive vehicle to control the operating speed of the motor.

It is another object of this invention to provide such a device as above indicated which is readily mounted within the automotive vehicle for operative association with the gas pedal thereof and which normally automatically assumes a retracted position.

It is more specifically an object of this invention to provide an adjustable self retractable device for mounting under the cowl portion of an automotive vehicle which may be readily adjustably positioned to engage and depress the gas pedal of said vehicle sufficiently to cause the motor of said vehicle to operate at a desired rate of speed, such as at a fast idling speed or at a certain travel speed.

It is also an object of this invention in view of the above object to design and construct said device to have the same assume a retracted position by a slight depression of the gas pedal by the operator.

These and other objects and advantages of the invention will be fully set forth in the following description made in connection with the accompanying drawings in which like reference characters refer to similar parts throughout the several views and in which:

FIG. 1 is a broken view showing applicant's device in side elevation in operating position and in dotted line in an alternative retracted position;

FIG. 2 is a broken view showing applicant's device in side elevation on an enlarged scale; and FIG. 3 is a view similar to that shown in FIG. 2 showing applicant's device in a top plan view.

Referring to the drawings, and more particularly to FIG. 1, a broken view is shown of the lower front interior portion of an automotive vehicle indicated generally by the character 10 and comprising a floor portion 12, an angled firewall 13, a cowl portion 15 and an inwardly curved portion 16 of said cowl forming a shelf. Also angled upwardly with respect to said cowl is a steering post 17. The operator's seat is indicated by the character 18.

Pivoted at its lower end by a hinge fixture 19 to a base portion of the firewall 13 is an accelerator or gas pedal 20. Engaged by the upper portion of said gas pedal and extending through the firewall 13 for conventional linkage with the carburetor of the motor of the vehicle indicated is a member 22 forming an accelerator link.

To be used in connection with the type of automotive vehicle indicated is applicant's device 25 comprising means for depressing the accelerator pedal. Said device may be variously formed as to its specific structure and is here shown in a preferred embodiment consisting of an elongated rod 26 substantially rectangular in cross section and of relatively small dimension having one end thereof reversely curved to be formed into an eyelet or loop 27 and having its other end portion 29 disposed within and integral with a rectangular collar 30 with said collar being of a width to provide passage for a second rod-like member such as member 26. Said member 26 has a lower side 32 into which is formed an open-ended notch 33 spaced a short distance from said loop 27.

Overlapping said rod 26 is a rod 35 of identical cross sectional dimension and of similar length having one free end portion formed into a right-angled lip portion 37.

The other end portion 38 of said rod 35 is disposed in and made integral with a rectangular collar 39 which is identical to the collar 30. Said collar 30 slidingly receives therethrough said rod 35 and said collar 39 receives therethrough rod 26 whereby said rods 26 and 35 have overlapping portions disposed through said collars 30 and 39 and are thus extensibly engaged relative to one another. Said rod 35 adjacent said collar 39 has a lateral inclined offset or step portion 42 spaced from said rod 26 with a substantially rectangular ring 44 encircling said rods 26 and 35 and being disposed between said collar 39 and the commencement of said offset portion 42. Said ring will be of such dimension as to slide freely over said rods but when moved in the direction of said offset portion it will lockingly engage said rods one with the other to prevent any relative or sliding movement between said rods, and in effect said rods will become an integral member.

With respect to said loop 27, a resilient member 45 is provided to form a universal joint therewith. Said resilient member 45 comprises a cylindrical shank 46 and upstanding therefrom a cup-shaped portion 47 having a radial slit 48 therein. Extending through said shank is an axial bore 50 having disposed therethrough a bolt 52 having a flanged head 53 overlying the free end of said shank. Said loop 27 is retained on said shank by said flanged head 53. Said loop 27 will fit loosely about said shank to have free movement about said shank and relatively free upward and downward swinging movement relative to the axis of said shank.

A relatively short coil spring 57 is provided having at one end thereof an elongated loop 58 integral therewith and slidably disposed over said rod 26 and engageable for removable anchorage in said notch 33. The other end of said spring 57 has formed integral therewith a loop 59 disposed over the bolt 52 and seated in said cup-shaped portion 47 and disposed through said slit 48. Said loop 59 has threaded thereover a lock nut 60. A wing nut 62 is provided to secure applicant's device in operating position as will be described.

Said cowl shelf 16 will have an aperture 16a to receive said bolt 52.

Operation

Applicant's device will be mounted under a convenient cowl portion of a motor vehicle substantially in alignment with the accelerator pedal. Applicant's device has sufficient universal movement so that it may be readily mounted to be within reaching distance of the accelerator or gas pedal.

As above described, the loop portion 27 of the rod 26 is mounted on the shank 46 of the resilient member 45. Said resilient member provides a cushion mounting. The bolt 52 will be extended through the aperture in the cowl shelf 16 and secured in position by the wing nut 62. The coil spring 57 is secured to the bolt 52 and by the lock nut 60 at the under or exposed side of the cowl shelf so that only the wing nut is necessary to be applied to the bolt 52 at the inner side of said shelf. This provides for a relatively easy and convenient mounting of applicant's device.

With the elongated loop of said spring 57 engaged in the notch 33, said spring will be under sufficient tension to automatically hold applicant's device in a retracted or horizontal position as indicated in FIG. 1, and will hold said device under sufficient tension so that there will be no rattling during movement of the vehicle.

When it is desired to depress the accelerator pedal 20, such as to cause a fast idling of the motor, the rods 26 and 35 of applicant's device will be swung downwardly into engagement with said accelerator pedal. The ring 44 will be moved away from the offset portion 42 and the rod 35 will be extended whatever distance is necessary in order to properly position the accelerator pedal. With the rod 35 extended a desired distance, the ring 44 will be moved in the direction of said offset portion to embrace the same and lockingly engage rods 26 and 35 with one another. Accelerator pedals are commonly depressed under spring tension and thus the pedal 20 will bear against the end of the rod 35 resting thereon sufficiently to hold applicant's device in operating position. Thus the applicant's device when once adjusted as to length will require no further adjustment for the purpose of causing the motor to idle at a desired rate of speed.

When a trip of some distance is contemplated, applicant's device may be adjusted as to length to depress the accelerator pedal 20 a sufficient distance to maintain a desired motor speed or travel speed, and thus the motor vehicle may be driven without the need of the operator having his foot on the accelerator pedal.

To retract applicant's device to its non-operative position, all that is necessary is a slight depression of the accelerator pedal by the foot of the operator and the coil spring 57 will swing the device 25 upwardly to the dotted line position indicated in FIG. 1.

Thus the applicant has provided a very simply constructed and efficient adjustable accelerator pedal depressing device which has proved to be completely successful in actual operation.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:

1. An accelerator rod mounted on a cowl of an automotive vehicle to depress the accelerator pedal of said vehicle having in combination,
    a pair of rods having overlapping portions,
    one of said rods having a loop at one end thereof,
    means holding said rods in sliding engagement relative to one another, one of said rods having an offset portion spaced laterally from an overlapping portion of said other rod,
    a ring slidable on said rods engaging said offset portion to lockingly embrace said rods with one another,
    means disposed through said loop for universal movement of said rods thereabout,
    means securing said last mentioned means to said cowl, and
    means resiliently securing said rods to said last mentioned means in swinging relation therewith.

2. An accelerator rod mounted on a cowl of an automotive vehicle to depress the accelerator pedal of said vehicle having in combination,
    a pair of rod-like members,
    means holding said rods in overlapping sliding engagement with one another,
    means removably embracing said rods to lockingly engage said rods with one another,
    a loop at the free end of one of said rods,
    a resilient cylindrical member disposed through said loop for universal movement of said one of said rods thereabout,
    means securing said resilient member to said cowl, and
    a resilient member swingingly connecting said rods to said means whereby said rods are normally held in a nonoperating position and are held in operating position under tension of said resilient member.

3. The structure set forth in claim 2,
    said means comprising a bolt disposed through said cylindrical resilient member securing the same to said cowl.

4. The structure set forth in claim 2,
    said last mentioned resilient member comprising a coil spring having one end anchored to said means securing said first mentioned resilient member and having its other end under tension anchored to one of said rods.

References Cited by the Examiner

UNITED STATES PATENTS

| 1,707,113 | 3/29 | Christ | 74—532 |
| 2,243,286 | 5/41 | Probst | 287—93 X |
| 2,604,241 | 7/52 | Gold | 287—58 |
| 2,671,355 | 3/54 | Hawkins | 74—532 |
| 3,018,122 | 1/62 | Frei et al. | 287—58 |
| 3,105,391 | 10/62 | Thompson | 74—526 X |

BROUGHTON G. DURHAM, *Primary Examiner.*

FRELING E. BAKER, *Examiner.*